United States Patent
Kobayashi

(10) Patent No.: US 9,967,687 B2
(45) Date of Patent: May 8, 2018

(54) AUDIO REPRODUCTION APPARATUS AND AUDIO REPRODUCTION SYSTEM

(71) Applicant: CLARION CO., LTD., Saitama (JP)

(72) Inventor: Shinichi Kobayashi, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days. days.

(21) Appl. No.: 15/509,320

(22) PCT Filed: Sep. 17, 2015

(86) PCT No.: PCT/JP2015/076410
§ 371 (c)(1),
(2) Date: Mar. 7, 2017

(87) PCT Pub. No.: WO2016/072160
PCT Pub. Date: May 12, 2016

(65) Prior Publication Data
US 2017/0280261 A1    Sep. 28, 2017

(30) Foreign Application Priority Data
Nov. 6, 2014   (JP) .................................. 2014-225750

(51) Int. Cl.
*H04R 27/00* (2006.01)
*G06F 3/16* (2006.01)
*H04M 1/725* (2006.01)

(52) U.S. Cl.
CPC ............. *H04R 27/00* (2013.01); *G06F 3/162* (2013.01); *H04M 1/72527* (2013.01); *H04R 2499/11* (2013.01); *H04R 2499/13* (2013.01)

(58) Field of Classification Search
CPC ................ H04R 27/00; H04R 2499/11; H04R 2499/13; G06F 3/162; H04M 1/72527
See application file for complete search history.

(56) References Cited

U.S. PATENT DOCUMENTS

2013/0288606 A1* 10/2013 Kirsch ................ H04M 1/6091
455/41.3

FOREIGN PATENT DOCUMENTS

EP         2 575 331 A1    4/2013
JP         2011-009809 A    1/2011
(Continued)

OTHER PUBLICATIONS

International Preliminary Report on Patentability issued for corresponding PCT/JP2015/076410.
(Continued)

*Primary Examiner* — Brenda C Bernardi
(74) *Attorney, Agent, or Firm* — IP Business Solutions, LLC

(57) ABSTRACT

To maintain favorable sound reproduction. In a car audio apparatus 6 which includes an inter-equipment communication unit 51 configured to perform communication according to each of a plurality of sound communication protocols Pv for transmitting a sound signal A3 of audio, and a reproduction processing unit 52 configured to reproduce the sound signal A3 received through the communication, and which receives the sound signal A3 from a smartphone 8 through communication according to any of the sound communication protocols Pv, the car audio apparatus 6 includes a priority storing unit 62 configured to store a priority of the sound communication protocols Pv in advance, and a sound signal input controlling unit 53 configured to, in the case where a sound communication request for transmitting the sound signal A3 is received from the smartphone 8, accept the sound communication request according to the priority of a sound communication protocol Pv of requested communication.

6 Claims, 11 Drawing Sheets

(56) References Cited

FOREIGN PATENT DOCUMENTS

| | | | | |
|---|---|---|---|---|
| JP | 2011009809 | A | * | 1/2011 |
| JP | 2012-192578 | A | | 10/2012 |
| JP | 2012192578 | A | * | 10/2012 |
| JP | 2012-227571 | A | | 11/2012 |
| JP | 2013-077968 | A | | 4/2013 |
| JP | 2014-051156 | A | | 3/2014 |
| JP | 2014051156 | A | * | 3/2014 |

OTHER PUBLICATIONS

Written Opinion of the International Searching Authority issued for corresponding PCT/JP2015/076410.
International Search Report issued for corresponding PCT/JP2015/076410 application.
Written Opinion of the International Search Authority issued for corresponding PCT/JP2015/076410 application.

* cited by examiner

FIG.3

| | COMMUNICATION STANDARDS ||
|---|---|---|
| SMARTPHONE 8 | WIRED COMMUNICATION | RADIO COMMUNICATION |
| 8A — SMARTPHONE CONNECTED USING HDMI | HDMI | Bluetooth |
| 8B — SMARTPHONE CONNECTED USING USB | USB | Bluetooth |

FIG.4

| COMMUNICATION STANDARDS | SOUND COMMUNICATION PROTOCOL Pv |
|---|---|
| Bluetooth | A2DP |
| HDMI | HDMI |
| USB | USB |

FIG.5

| | AUDIO SOURCE | REMOTE CONTROL COMMUNICATION PROTOCOL Pc | SOUND COMMUNICATION PROTOCOL Pv |
|---|---|---|---|
| REPRODUCTION APPLICATION 42A | BODY | AVRCP | INDEFINITE |
| REPRODUCTION APPLICATION 42B | BODY | AVRCP | INDEFINITE |
| REPRODUCTION APPLICATION 42C | BODY AND DISTRIBUTION SERVER | USB | USB |
| REPRODUCTION APPLICATION 42D | BODY AND DISTRIBUTION SERVER | iAP | Bluetooth |
| REPRODUCTION APPLICATION 42E | BODY AND DISTRIBUTION SERVER | SPP | HDMI |

FIG.7

| COMMUNICATION STANDARDS | SOUND COMMUNICATION PROTOCOL Pv |
|---|---|
| 1 | HDMI |
| 2 | USB |
| 3 | A2DP |

64: PRIORITY DATA (SUPERIOR) ↑ REPRODUCTION QUALITY ↓ (INFERIOR)

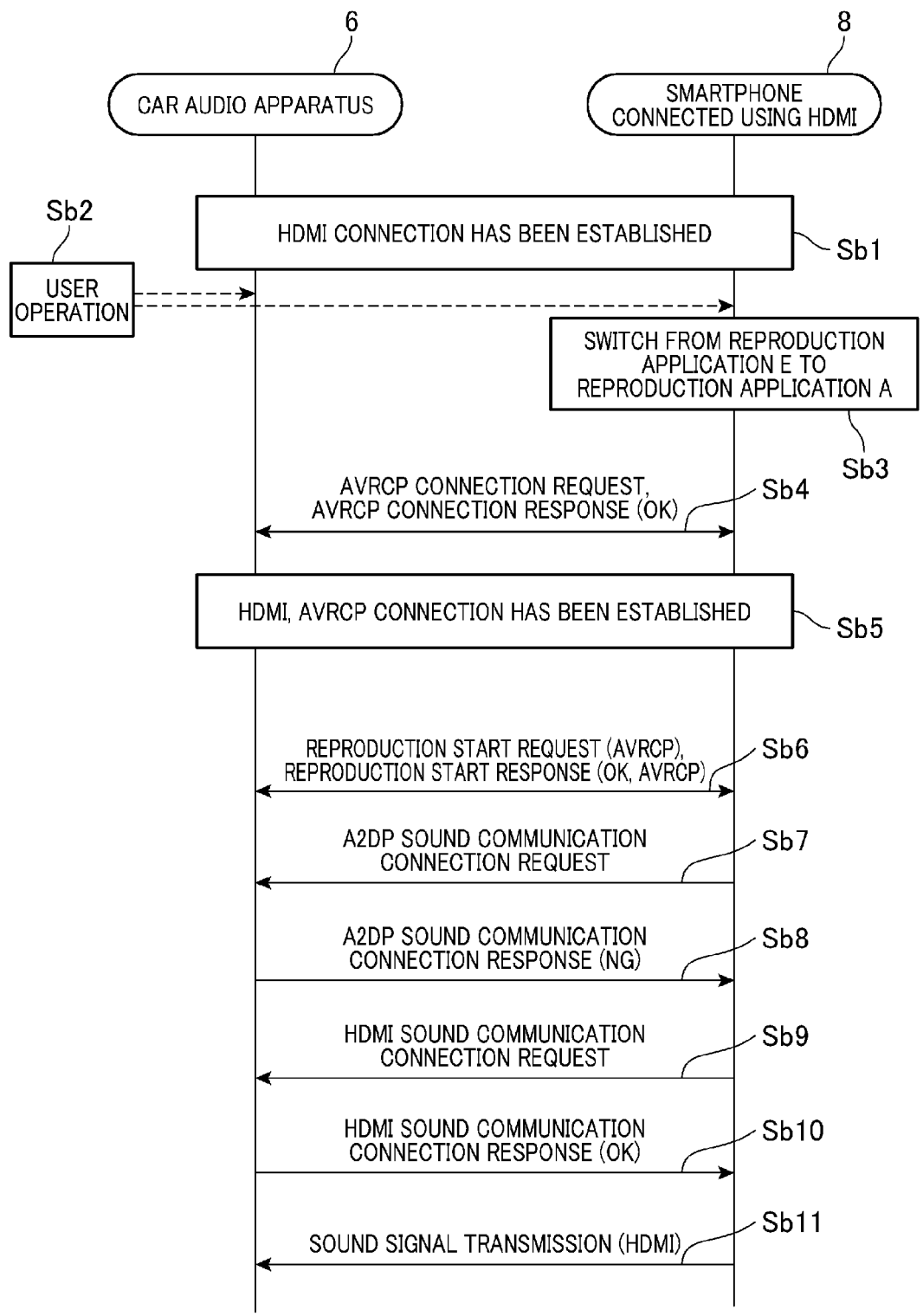

FIG.11

| COMMUNICATION POSSIBLE SOUND PROTOCOL | SOUND COMMUNICATION CONNECTION REQUEST PROTOCOL | INPUT CONTROL RESULT |
|---|---|---|
| A2DP | HDMI OR USB | DISCONNECT ESTABLISHMENT OF A2DP CONNECTION AND ESTABLISH HDMI OR USB CONNECTION |
| HDMI | A2DP | REJECT A2DP CONNECTION REQUEST |
| HDMI | USB | REJECT USB CONNECTION REQUEST |
| USB | A2DP | REJECT A2DP CONNECTION REQUEST |
| USB | HDMI | LOGICALLY DISCONNECT ESTABLISHMENT OF USB CONNECTION AND ESTABLISH HDMI CONNECTION |

AUDIO REPRODUCTION APPARATUS AND AUDIO REPRODUCTION SYSTEM

TECHNICAL FIELD

The present invention relates to an audio reproduction apparatus and an audio reproduction system.

BACKGROUND ART

In AV (Audio and Visual) systems including amplifier equipment, there is amplifier equipment which supports both an interface for radio communication and an interface for wired communication. This amplifier equipment is configured to be able to amplify a sound signal received at either interface and output the amplified sound signal.

Further, a technique is known in which an acquisition path of a sound signal is automatically changed to an interface for wired communication when amplifier equipment can receive the sound signal from portable information equipment at both interfaces. According to this technique, the amplifier equipment can perform stable communication with the portable information equipment, so that it is possible to make it less likely to cause a gap between an image to be displayed at display equipment and sound to be output via the amplifier equipment (see, for example, Patent Literature 1).

CITATION LIST

Patent Literature

Patent Literature 1: Japanese Patent Laid-Open No. 2012-227571

SUMMARY OF INVENTION

Technical Problem

However, there is a problem that it is not always favorable in sound reproduction to output a sound signal to amplifier equipment through an interface for wired communication in place of an interface for radio communication.

The present invention has been made in view of the above-described circumstances, and an object of the present invention is to provide an audio reproduction apparatus and an audio reproduction system which can favorably maintain sound reproduction.

Solution to Problem

This specification incorporates all the content of Japanese Patent Application No. 2014-225750 filed on Nov. 6, 2014.

To achieve the above-described object, the present invention provides an audio reproduction apparatus which includes a communication unit configured to perform communication according to each of a plurality of communication protocols for transmitting a sound signal of audio, and a reproduction processing unit configured to reproduce the sound signal received through the communication, and which receives a sound signal from external equipment through communication according to any of the communication protocols, the audio reproduction apparatus including a priority storing unit configured to store a priority of the communication protocols in advance, and a control unit configured to, in the case where a communication request for transmitting the sound signal is received from the external equipment, accept the communication request according to the priority of a communication protocol of requested communication.

Further, in the audio reproduction apparatus of the present invention, the control unit accepts the communication request only in the case where the priority of the communication protocol of the requested communication is the highest among communication protocols which can be used for communication for transmitting the sound signal with the external equipment.

Further, in the audio reproduction apparatus of the present invention, the control unit judges the priority such that a communication protocol of communication which is being established with the external equipment and the communication protocol of the requested communication are communication protocols which can be used for communication for transmitting the sound signal with the external equipment.

Further, in the audio reproduction apparatus of the present invention, in the case where the communication request is accepted, the control unit disconnects connection of communication using a communication protocol with a lower priority than the priority of the communication protocol of the requested communication among communication for which communication connection is being established.

Further, in the audio reproduction apparatus of the present invention, in the case where the communication request for transmitting the sound signal is received from the external equipment, when another communication according to the communication protocol is being established with the external equipment, the control unit does not accept the communication request to maintain the communication.

Further, in the audio reproduction apparatus of the present invention, the priority is determined based on sound quality of reproduced audio.

Further, in the audio reproduction apparatus of the present invention, in the case where the external equipment is a phone, the control unit accepts a communication request for transmitting a sound signal of a phone call made through the external equipment.

Further, to solve the above-described problem, the present invention provides an audio reproduction system including an audio reproduction apparatus which includes a communication unit configured to perform communication according to each of a plurality of communication protocols for transmitting a sound signal of audio, and a reproduction processing unit configured to reproduce the sound signal received through the communication, and external equipment configured to transmit the sound signal to the audio reproduction apparatus through communication according to any of the communication protocols, the audio reproduction apparatus including a priority storing unit configured to store a priority of the communication protocols in advance, and a control unit configured to, in the case where a communication request for transmitting the sound signal is received from the external equipment, accept the communication request according to the priority of a communication protocol of requested communication, and, in the case where the communication request is not accepted, the external equipment changes the communication protocol to transmit the communication request to the audio reproduction apparatus.

Advantageous Effect of Invention

According to the present invention, it is possible to realize favorable sound reproduction.

BRIEF DESCRIPTION OF DRAWINGS

FIG. 3 is a diagram illustrating communication standards to be used by a smartphone in the in-vehicle audio system.

FIG. 4 is a diagram illustrating communication protocols which can be utilized for transmission of a sound signal for each of the communication standards.

FIG. 5 is a diagram illustrating an example of correspondence between a reproduction application and communication protocols to be used for transmission/reception of a remote control command signal.

FIG. 7 is a diagram illustrating an example of priority data.

FIG. 10 is a sequence diagram illustrating an example of operation of the in-vehicle audio system.

FIG. 11 is a diagram illustrating correspondence among communication possible sound communication protocols, sound communication request communication protocols and input control content.

DESCRIPTION OF EMBODIMENTS

Figure 1:
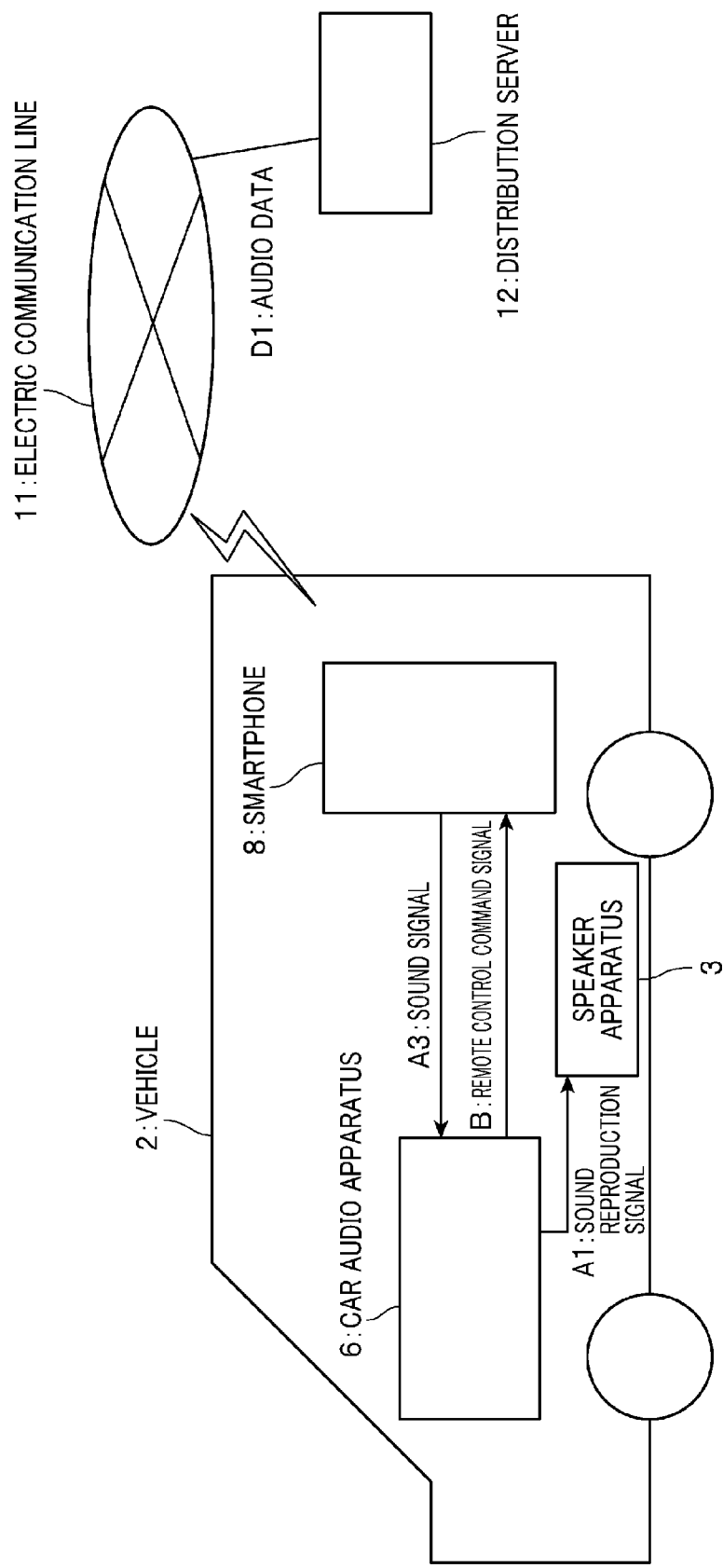
FIG. 1 is a diagram illustrating a configuration of an in-vehicle audio system according to an embodiment of the present invention.

FIG. 1 is a diagram illustrating a configuration of an in-vehicle audio system 1 according to an embodiment of the present invention.

The in-vehicle audio system 1 is a system which is provided in a vehicle 2 in which a speaker apparatus 3 is provided, and which outputs a sound reproduction signal A1 of audio to the speaker apparatus 3 and reproduces audio sound inside the vehicle. As illustrated in FIG. 1, the in-vehicle audio system 1 includes a car audio apparatus 6 and a smartphone 8.

The car audio apparatus 6 is one form of in-vehicle equipment mounted on the vehicle 2. This car audio apparatus 6 receives input of a sound signal A3 of audio to be reproduced from external equipment, performs signal processing on the sound signal A3 to generate the above-described sound reproduction signal A1, outputs the sound reproduction signal A1 to the speaker apparatus 3 and reproduces audio sound.

The smartphone 8 is one form of a mobile phone, and a mobile phone provided with multiple functions. In this in-vehicle audio system 1, the smartphone 8 is used as the above-described external equipment which inputs the sound signal A3 to the car audio apparatus 6.

Figure 2:
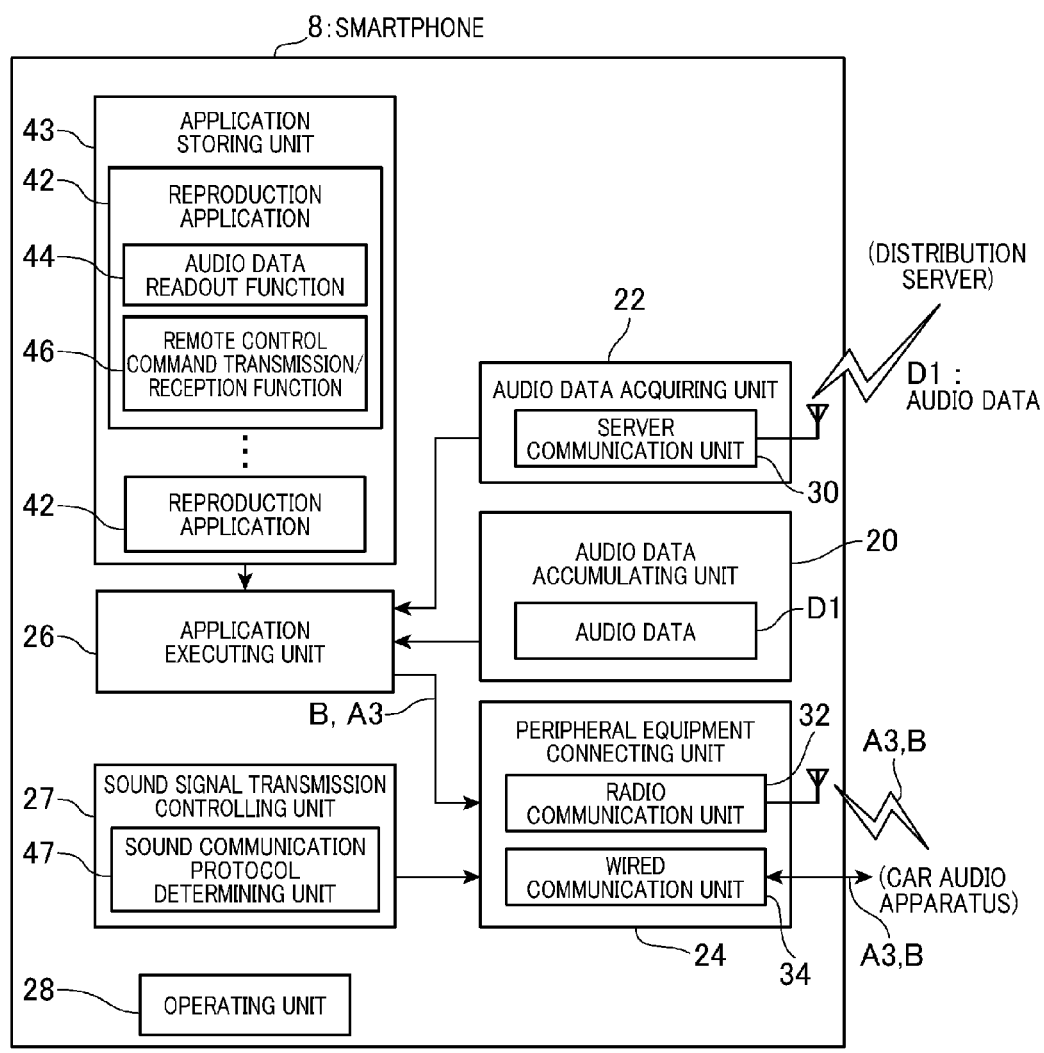
FIG. 2 is a block diagram illustrating a functional configuration of a smartphone.

FIG. 2 is a block diagram illustrating a functional configuration of the smartphone 8.

As illustrated in FIG. 2, the smartphone 8 includes an audio data accumulating unit 20, an audio data acquiring unit 22, a peripheral equipment connecting unit 24, an application executing unit 26, a sound signal transmission controlling unit 27 and an operating unit 28. The operating unit 28, which accepts operation of a user, includes a hardware key and a touch panel.

The audio data accumulating unit 20 and the audio data acquiring unit 22 are sources of audio data D1 (so-called, audio sources) which are basis of the sound signal A3 of audio input to the car audio apparatus 6.

The audio data accumulating unit 20, which stores a number of pieces of audio data D1 in advance, includes a recording medium which can read/write the audio data D1. As this recording medium, an HDD or an SSD incorporated into the smartphone 8, a semiconductor memory, or a recording medium which can be loaded to the smartphone 8 is preferably used.

The audio data acquiring unit 22 acquires the audio data D1 from an audio source provided outside the smartphone 8. More specifically, as illustrated in FIG. 1, this smartphone 8 uses a distribution server 12 which is connected to an electric communication line 11 so as to be able to perform communication as an audio source, and has a function of acquiring the audio data D1 from this distribution server 12.

That is, as illustrated in FIG. 2, the audio data acquiring unit 22 includes a server communication unit 30 which communicates with the distribution server 12 and acquires the audio data D1 through communication with the distribution server 12. The sound signal A3 based on this audio data D1 is input to the car audio apparatus 6. The electric communication line 11 includes a mobile phone network and the Internet, and the server communication unit 30 includes a communication module for performing communication connection with the mobile phone network so as to be able to transmit/receive data.

The peripheral equipment connecting unit 24, which performs communication connection (that is, establishes a communication link) with the car audio apparatus 6 and other peripheral equipment using both radio communication and wired communication as appropriate, includes a radio communication unit 32 and a wired communication unit 34.

The radio communication unit 32 which performs communication with the car audio apparatus 6 while complying with predetermined radio communication standards, includes an antenna required for this radio communication and various kinds of circuits (for example, a communication controller, a transmission circuit and a reception circuit).

The wired communication unit 34 which performs communication with the car audio apparatus 6 while complying with predetermined wired communication standards, includes a connector required for this wired communication and various kinds of circuits (for example, a communication controller, a transmission circuit and a reception circuit).

The application executing unit 26 which executes an application program installed in this smartphone 8, includes a memory device and an MPU. A reproduction application 42 for coordinating with the car audio apparatus 6 to cause the car audio apparatus 6 to reproduce sound is installed in an application storing unit 43 of this smartphone 8 as the application program. The application storing unit 43 is, for example, a memory device incorporated into the smartphone 8.

The reproduction application 42 has a general function required for coordinating with the car audio apparatus 6 to cause the car audio apparatus 6 to reproduce sound based on the audio source, and includes at least an audio data readout function 44 and a remote control command transmission/reception function 46.

The audio data readout function 44 is a function of reading out the audio data D1 from the audio source and performing predetermined signal processing such as decoding processing to generate a sound signal A3.

In this smartphone 8, as the audio source, as described above, the audio data accumulating unit 20 incorporated into the body of the smartphone 8 and the distribution server 12 which is located outside the smartphone 8 are used.

The remote control command transmission/reception function 46 is a function of transmitting/receiving a signal (hereinafter, referred to as a "remote control command signal") B for remotely controlling reproduction operation such as start and termination of reproduction of sound between the smartphone 8 and the car audio apparatus 6 through communication.

In the case where the user operates the operating unit 28 of the smartphone 8 to remotely control reproduction operation, the remote control command signal B is transmitted to the car audio apparatus 6 from the smartphone 8. Further, inversely, in the case where remote control is performed through user operation of the car audio apparatus 6, the remote control command signal B is transmitted from the car audio apparatus 6 to the smartphone 8.

The sound signal transmission controlling unit 27 controls transmission of the sound signal A3 to the car audio apparatus 6 in association with execution of the reproduction application 42. The sound signal transmission controlling unit 27 includes a sound communication protocol determining unit 47 configured to determine a communication protocol (hereinafter, referred to as a "sound communication protocol") Pv of communication to be used for transmission of the sound signal A3.

The sound communication protocol Pv is a protocol which can be utilized for transmission of a sound signal among communication protocols defined in respective communication standards of the radio communication unit 32 and the wired communication unit 34.

In the communication protocol which defines regulations regarding communication, physical conditions of a transmission medium (transmission path), communication control content, or the like, are defined. As the physical conditions, in the case of wired communication, shapes and electrical characteristics of a cable and a connector, an optical wavelength and a modulation scheme are defined, while, in the case of radio communication, a frequency band and a modulation scheme are defined.

The sound communication protocol determining unit 47 determines one of the sound communication protocols Pv which can be utilized at the radio communication unit 32 and the wired communication unit 34 and controls the peripheral equipment connecting unit 24 to transmit the sound signal A3 through communication using this sound communication protocol Pv. Further, the sound communication protocol determining unit 47 has a function of changing the communication protocol to another sound communication protocol Pv in the case where communication cannot be performed with the car audio apparatus 6 using the determined sound communication protocol Pv.

Such a function of the sound communication protocol determining unit 47 is typically implemented on an OS (Operating System) mounted on the smartphone 8, and the sound communication protocol determining unit 47 is configured using this function.

Here, typically, in a portable information terminal such as the smartphone 8 and a tablet terminal, Bluetooth (registered trademark) standards which is one form of near field radio communication is used as standards of radio communication.

Further, in the portable information terminal, as wired communication, any of the following is typically used. That is, one of communication complying with HDMI (registered trademark) (High-Definition Multimedia Interface) and communication complying with USB (Universal Serial Bus) standards which is one of serial bus standards is used.

FIG. 3 is a diagram illustrating communication standards to be used by the smartphone 8 in this in-vehicle audio system 1.

In the smartphone 8A connected using HDMI, HDMI is used as communication standards of wired communication, and Bluetooth is used as communication standards of radio communication. This combination of communication standards of wired communication and radio communication is often employed in the portable information terminal in which Android (registered trademark) is loaded as the OS.

In the smartphone 8B connected using USB, USB is used as communication standards of wired communication, and Bluetooth is used as communication standards of radio communication. This combination of communication standards of wired communication and radio communication is often employed in the portable information terminal (for example, iPhone (registered trademark), iPod (registered trademark)) in which iOS (registered trademark) is loaded as the OS.

Note that, in the smartphone 8A connected using HDMI, it is possible to use MHL (Mobile High-Definition Link) (registered trademark) standards which are standards for performing transmission by way of a Micro USB port for transmission of an HDMI signal which complies with an HDMI protocol. By this means, a connector for Micro USB can be also used as a connector for an HDMI cable.

FIG. 4 is a diagram illustrating sound communication protocols Pv which can be utilized for transmission of a sound signal for each of communication standards.

As illustrated in FIG. 4, in HDMI, USB and Bluetooth, as the sound communication protocols Pv which can be utilized for transmission of the sound signal A3, an HDMI protocol, a USB protocol and an A2DP (Advanced Audio Distribution Profile) profile are respectively defined.

In this smartphone 8, one of the sound communication protocols Pv for these HDMI, A2DP and USB is used for transmission of the sound signal A3 according to the communication standards that the radio communication unit 32 and the wired communication unit 34 comply with.

Further, as described above, the reproduction application 42 of the smartphone 8 transmits/receives the remote control command signal B between the smartphone 8 and the car audio apparatus 6 using the remote control command transmission/reception function 46. A communication protocol (hereinafter, referred to as a "remote control communication protocol") Pc to be used for communication of this transmission/reception is defined in advance for each reproduction application 42.

FIG. 5 is a diagram illustrating an example of correspondence between the reproduction application 42 and the remote control communication protocol Pc to be used for transmission/reception of the remote control command signal B.

In the reproduction application 42 illustrated in FIG. 5, combination of the remote control communication protocol Pc and the audio source is different.

Specifically, the reproduction application 42A uses the audio data accumulating unit 20 (that is, the body of the smartphone 8) as the audio source. Further, the reproduction application 42A uses AVRCP (Audio/Video Remote Control Profile) defined in Bluetooth as the remote control communication protocol Pc.

The reproduction application 42B uses the distribution server 12 as the audio source, and uses the above-described AVRCP as the remote control communication protocol Pc.

The reproduction application 42C uses the body and the distribution server 12 as the audio sources and uses USB as the remote control communication protocol Pc.

The reproduction application 42D uses the body and the distribution server 12 as the audio sources and uses iAP (iPod Accessory Protocol) as the remote control communication protocol Pc. iAP is a communication protocol which enables communication connection of the car audio apparatus 6 to equipment in which iOS is loaded as the OS using Bluetooth, and, in this iAP, SPP (Serial Port Profile) of Bluetooth is utilized.

The reproduction application 42E uses the body and the distribution server 12 as the audio sources and use the above-described SPP as the remote control communication protocol Pc.

In the smartphone 8, the reproduction application 42 which supports communication standards that the radio communication unit 32 and the wired communication unit 34 comply with is installed as appropriate among the reproduction applications 42A to 42E.

Further, in some of the reproduction applications 42A to 42E, a sound communication protocol Pv to be used for transmission of the sound signal A3 is explicitly set in advance. For example, in the reproduction application 42C, USB is designated as the sound communication protocol Pv, in the reproduction application 42D, Bluetooth is designated as the sound communication protocol Pv, and in the reproduction application 42E, HDMI is designated as the sound communication protocol Pv.

In the smartphone 8, in the case where the sound communication protocol Pv is set in the reproduction application 42, the sound signal A3 is transmitted through communication using the sound communication protocol Pv based on this setting upon execution of the reproduction application 42.

In the reproduction application 42 in which the sound communication protocol Pv is not set, the sound communication protocol Pv is determined as follows by the sound communication protocol determining unit 47.

That is, the sound communication protocol determining unit 47 determines a protocol defined in the communication standards which are the same as those of the remote control communication protocol Pc of the reproduction application 42 as the sound communication protocol Pv. For example, upon execution of the reproduction applications 42A and 42B, because AVRCP of Bluetooth is used as the remote control communication protocol Pc, A2DP defined in Bluetooth is determined as the sound communication protocol Pv.

Further, if communication using the determined sound communication protocol Pv cannot be performed with the car audio apparatus 6, the sound communication protocol determining unit 47 sequentially tries communication using the sound communication protocol Pv of communication standards with which communication with the car audio apparatus 6 has been established. The sound communication protocol determining unit 47 then transmits the sound signal A3 through communication using the sound communication protocol Pv with which communication can be performed through this trial.

For example, a case will be described as an example where communication of both HDMI and Bluetooth has been established between the smartphone 8 and the car audio apparatus 6. In this case, if communication using A2DP of Bluetooth as the sound communication protocol Pv cannot be performed, the sound communication protocol determining unit 47 tries communication using HDMI as the sound communication protocol Pv.

Note that, in the case where a plurality of sound communication protocols Pv are to be tried, the order of trial of the sound communication protocols Pv is determined as appropriate by the OS, or the like.

Figure 6:
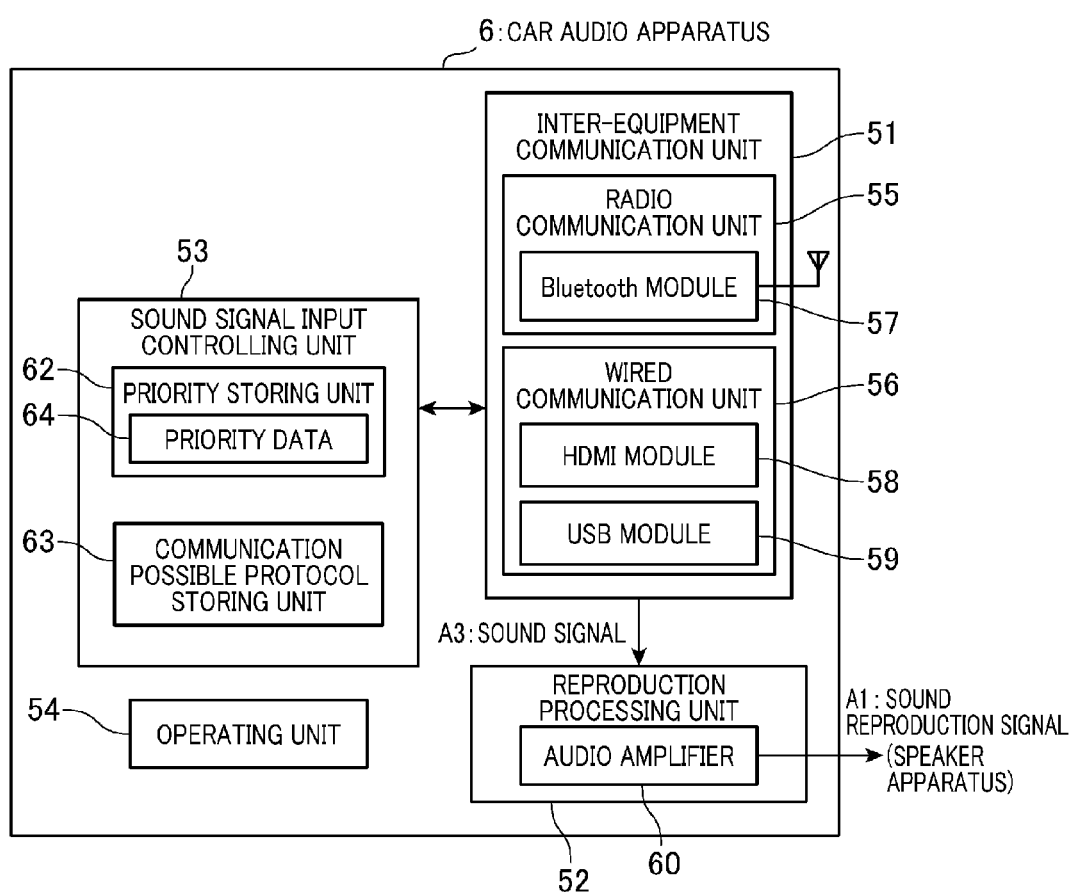
FIG. 6 is a block diagram illustrating a functional configuration of a car audio apparatus.

FIG. 6 is a block diagram illustrating a functional configuration of the car audio apparatus 6.

The car audio apparatus 6 includes an inter-equipment communication unit 51, a reproduction processing unit 52, a sound signal input controlling unit 53 and an operating unit 54. The operating unit 54, which accepts user operation, is configured to include a hardware key and a touch panel.

The inter-equipment communication unit 51, which performs communication connection (that is, establishes a communication link) of the smartphone 8 through radio communication and wired communication, accepts input of the sound signal A3, and transmits/receives the remote control command signal B, includes a radio communication unit 55 and a wired communication unit 56. These radio communication unit 55 and the wired communication unit 56 are configured to support communication standards which can be used by the smartphone 8 to be used in the in-vehicle audio system 1.

Specifically, the radio communication unit 55 includes a Bluetooth module 57 and performs communication complying with Bluetooth with the smartphone 8. Further, the wired communication unit 56 includes an HDMI module 58 which performs communication complying with HDMI and a USB module 59 which performs communication complying with USB. Each of these radio communication unit 55 and the wired communication unit 56 is configured to be able to perform communication using the remote control communication protocol Pc and the sound communication protocol Pv (that is, at least the remote control communication protocol Pc and the sound communication protocol Pv illustrated in FIG. 4 and FIG. 5) which are used by the smartphone 8 for communication.

The reproduction processing unit 52 performs signal processing on the sound signal A3 input from the smartphone 8 to generate a sound reproduction signal A1 and outputs the sound reproduction signal A1 to the speaker apparatus 3. That is, the reproduction processing unit 52 includes an audio amplifier 60 which amplifies the sound signal A3 and provides various kinds of acoustic effects to the sound signal A3.

The sound signal input controlling unit 53 performs control so that the sound communication protocol Pv to be used for inputting of the sound signal A3 with the smartphone 8 becomes a predetermined protocol.

More specifically, in transmission of the sound signal A3 of audio, there arises a difference in reproduction quality (also referred to as sound quality) due to a signal transmission form (such as a transmission medium and a transmission band). For example, in the case where a transmission medium is different, according to whether the transmission medium is a wired cable or a radio wave, there arises a difference in reproduction quality. Further, even in the same wired cable, reproduction quality is different for each communication protocol in which a wired cable to be used is standardized, for example, different between an HDMI cable and a USB cable. The same will also apply in the case of radio communication.

However, as described above, the sound communication protocol Pv which is to be used by the smartphone 8 for transmission of the sound signal A3 is determined by the smartphone 8, and the sound communication protocol Pv with which reproduction quality becomes the best is not always determined. Further, because the smartphone 8 determines the sound communication protocol Pv, the car audio apparatus 6 cannot explicitly designate the sound communication protocol Pv to the smartphone 8.

Therefore, in the car audio apparatus 6, the sound signal input controlling unit 53 induces the sound communication protocol Pv determined by the smartphone 8. By this means, the sound signal A3 is transmitted using a protocol with which reproduction quality becomes the best among the sound communication protocols Pv which can be used by the smartphone 8.

More specifically, as illustrated in FIG. 6, the sound signal input controlling unit 53 includes a priority storing unit 62 and a communication possible protocol storing unit 63.

The priority storing unit 62 stores priority data 64. In the priority data 64, the sound communication protocols Pv which can be utilized by the car audio apparatus 6 to perform communication for inputting the sound signal A3 are ranked according to reproduction quality.

FIG. 7 is a diagram illustrating an example of the priority data 64.

As illustrated in FIG. 7, in this car audio apparatus 6, the priority data 64 is set such that the sound communication protocols Pv are prioritized in order of an HDMI protocol, a USB protocol and an A2DP protocol.

The priority of the priority data 64 can be changed as appropriate to the order such that the protocols are ranked according to user preference.

The communication possible protocol storing unit 63 sequentially records the sound communication protocols Pv which are used by the smartphone 8 to transmit the sound signal A3 for the smartphone 8 with which communication connection (communication link) is established through the inter-equipment communication unit 51. Specifically, every time the sound signal input controlling unit 53 receives a request for communication for transmission of the sound signal A3 from the smartphone 8, the sound signal input controlling unit 53 records the sound communication protocols Pv used for requested communication in the communication possible protocol storing unit 63.

Note that, in the case of wired communication, even in the case where the wired cable is physically (electrically) connected (inserted) to establish a physical link, if logical communication connection (for example, a data link) which enables transmission/reception of data from/to each other is not established, the protocol is recorded at the next timing. That is, this case is a situation where it is unclear whether or not it is possible to transmit the sound signal A3 using the wired cable. Therefore, the protocol is not recorded in the communication possible protocol storing unit 63, and the protocol is recorded when logical communication connection is established (that is, when data can be transmitted/received from/to each other).

Further, in the case where physical connection between the smartphone 8 and the inter-equipment communication unit 51 is disconnected and communication connection is disconnected as a result of a wired cable being disconnected, radio communication being turned off, or the like, in order that communication using the sound communication protocol Pv used for the communication connection might not be performed, a record of this sound communication protocol Pv is deleted from the communication possible protocol storing unit 63.

Further, the record of the communication possible protocol storing unit 63 is initialized in the case where all communication connection between the smartphone 8 and the inter-equipment communication unit 51 is disconnected.

Figure 8:
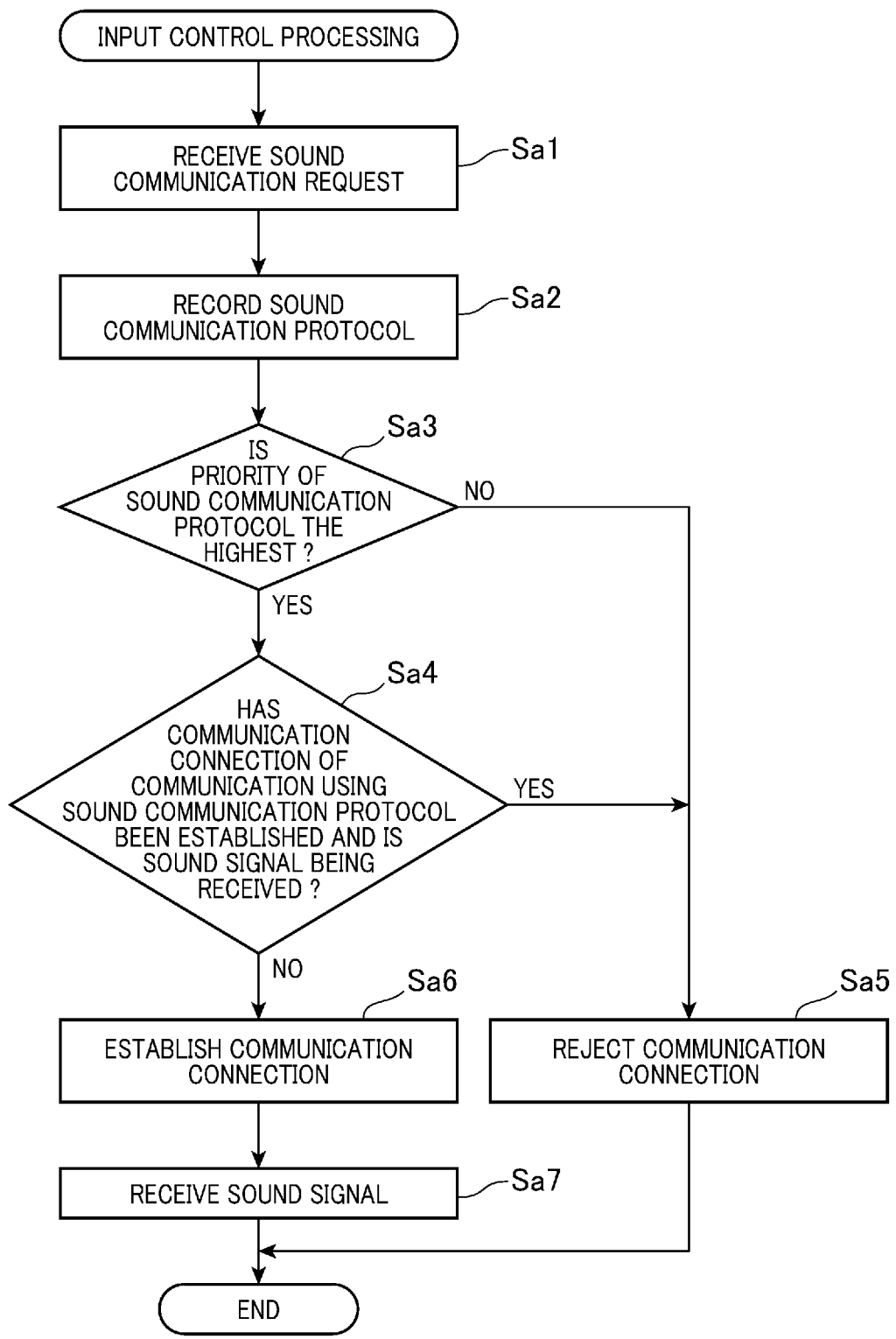
FIG. 8 is a flowchart illustrating operation of a sound signal input controlling unit.

FIG. 8 is a flowchart illustrating input control processing of the sound signal input controlling unit 53.

The input control processing illustrated in FIG. 8 is processing for inducing (that is, indirectly controlling) the smartphone 8 to transmit the sound signal A3 through communication using the predetermined sound communication protocol Pv. This input control processing is executed by the sound signal input controlling unit 53 every time a communication request for transmitting the sound signal A3 (hereinafter, referred to as a "sound communication request") is received from the smartphone 8 in association with execution of the reproduction application 42 at the smartphone 8.

Specifically, in the case where the sound communication request is received from the smartphone 8 (step Sa1), the sound signal input controlling unit 53 records the sound communication protocol Pv used for the requested communication in the communication possible protocol storing unit 63 (step Sa2). This record enables the car audio apparatus 6 to recognize the sound communication protocol Pv which can be used by the smartphone 8 to perform sound communication.

Subsequently, the sound signal input controlling unit 53 judges the priority of the sound communication protocol Pv of the requested communication (step Sa3). In this judgement of the priority, it is judged whether or not the priority of the sound communication protocol Pv of the requested communication is the highest among all the sound communication protocols Pv of the sound communication protocols Pv recorded in the communication possible protocol storing unit 63 including the sound communication protocol Pv of the requested communication.

In the case where the priority is the highest (step Sa3: Yes), the sound signal input controlling unit 53 judges whether or not communication connection (communication link) of communication using the sound communication protocol Pv has been already established with the smartphone 8 and the sound signal A3 is being received before accepting the sound communication request (step Sa4).

For example, in the case where transmission of the sound signal A3 to the car audio apparatus 6 from the smartphone 8 is continuously performed as a result of another reproduction application 42 having been already executed, another application program being executed in association with transmission/reception of the sound signal A3 between the smartphone 8 and the car audio apparatus 6, or the like, there is a case where communication connection of the sound communication has been already established, and the sound signal A3 is being received.

In the case where communication connection has been established, and the sound signal A3 is being received (step Sa4: Yes), in order to maintain sound reception operation using this communication connection, the sound signal input controlling unit 53 rejects the sound communication request (step Sa5). As a result of the sound reception operation being maintained in this manner, it is possible to prevent occurrence of temporal sound drop-out during reproduction due to temporal interruption of reception of the sound signal A3 in association with switching of the sound communication protocol Pv.

On the other hand, in the case where communication connection of communication using the sound communication protocol Pv has not been established (step Sa4: No), communication connection using the sound communication protocol Pv used for the communication requested in step Sa1 is established (step Sa6), and the sound signal A3 is received (step Sa7).

Further, in the case where the priority of the sound communication protocol Pv of the communication requested in step Sa1 is not the highest (step Sa3: No), the sound signal input controlling unit 53 rejects the sound communication request (step Sa5), and performs control so that the sound communication protocol Pv of communication used for the sound communication request at the smartphone 8 is changed. As a specific aspect of rejection of the sound communication request, an appropriate aspect such as, for example, non-response in which a response is not sent in response to a request and a rejection response in which a response indicating rejection is sent is used.

As described above, in the case where the sound communication request is rejected, at the smartphone 8, the sound signal transmission controlling unit 27 changes the sound communication protocol to another sound communication protocol Pv to try a sound communication request. In response to this sound communication request, the above-described processing in step Sa1 is executed again at the car audio apparatus 6.

As a result of such a series of processing, by the sound communication request being rejected, options of the sound communication protocols Pv which are to be used by the smartphone 8 are limited to the sound communication protocols Pv with which the car audio apparatus 6 is to accept the communication request. When the smartphone 8 makes a sound communication request using the sound communication protocol Pv with the highest priority or the sound communication protocol Pv with which communication connection has been already established among the sound communication protocols Pv recorded in the communication possible protocol storing unit 63, communication using the sound communication protocol Pv is established between the car audio apparatus 6 and the smartphone 8, and the sound signal A3 is transmitted through this communication.

Note that the sound communication protocols Pv may be recorded in the communication possible protocol storing unit 63 such that only the sound communication protocols Pv with higher priorities are left according to the priority data 64.

Further, in the case where the car audio apparatus 6 can acquire identification information (such as, for example, a MAC address) for uniquely identifying the smartphone 8, it is also possible to store the sound communication protocol Pv used by the smartphone 8 to transmit the sound signal A3 in association with the identification information of the smartphone 8 also after communication connection with the smartphone 8 is disconnected and perform judgement in step Sa3 with reference to the sound communication protocol Pv when communication connection is established again.

Figure 9:
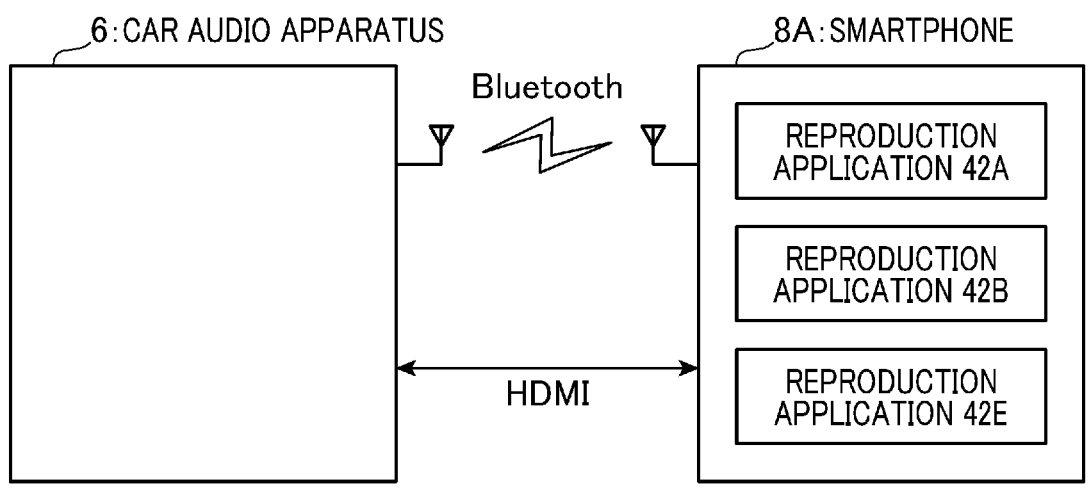
FIG. 9 is a schematic diagram of the in-vehicle audio system.

FIG. 9 is a schematic diagram of the in-vehicle audio system 1. FIG. 9 illustrates a case where the smartphone 8 is a smartphone 8A connected using HDMI.

In the smartphone 8A connected using HDMI, communication connection is established between the car audio apparatus 6 and the smartphone 8A connected using HDMI using both Bluetooth which is for radio communication and HDMI which is for wired communication or using only Bluetooth.

For example, in the case where the reproduction application 42A (FIG. 5) is installed in the smartphone 8A connected using HDMI, and the reproduction application 42A is executed at the smartphone 8A connected using HDMI, because the reproduction application 42A uses AVRCP as the remote control communication protocol Pc, and the sound communication protocol Pv is indefinite, normally, communication connection is established between the car audio apparatus 6 and the smartphone 8A connected using HDMI only using Bluetooth.

Further, for example, in the case where the reproduction application 42E (FIG. 5) is installed through HDMI connection in the smartphone 8A connected using HDMI, and the reproduction application 42E is executed at the smartphone 8A connected using HDMI, because the reproduction application 42E uses AVRCP as the remote control communication protocol Pc, and uses HDMI as the sound communication protocol Pv of the sound signal A3, communication connection is established between the car audio apparatus 6 and the smartphone 8A connected using HDMI using both Bluetooth and HDMI.

FIG. 10 is a sequence diagram illustrating an example of operation of the in-vehicle audio system 1.

FIG. 10 illustrate operation of the car audio apparatus 6 and the smartphone 8A connected using HDMI illustrated in FIG. 9. Further, as this operation, FIG. 10 illustrates operation when the smartphone 8A connected using HDMI executes the reproduction application 42E and then executes the reproduction application 42A.

In the case where the smartphone 8A connected using HDMI executes the reproduction application 42E and coordinates with the car audio apparatus 6 to reproduce the sound signal A3, as illustrated in FIG. 10, communication connection (communication link) using HDMI as the sound communication protocol Pv is established between the car audio apparatus 6 and the smartphone 8A connected using HDMI (step Sb1).

Subsequently, in the case where the reproduction application 42E is finished, and an application program to be executed is switched from the reproduction application 42E to the reproduction application 42A (step Sb3) through user operation (step Sb2), processing is performed for establishing communication connection of communication using the remote control communication protocol Pc for transmitting/receiving the remote control command signal B between the car audio apparatus 6 and the smartphone 8A connected using HDMI.

Specifically, because the reproduction application 42A uses AVRCP as the remote control communication protocol Pc, an AVRCP connection request and an AVRCP connection response (OK) in response to this connection request are transmitted/received between the car audio apparatus 6 and the smartphone 8A connected using HDMI (step Sb4), and communication connection using AVRCP as the remote control communication protocol Pc is established in addition to communication connection using HDMI as the sound communication protocol Pv which is established in advance (step Sb5).

This in-vehicle audio system 1 has a coordinating function of enabling switching of the reproduction application 42 and sound reproduction operation (operation such as start and stop of reproduction) to be accepted through user operation at either the car audio apparatus 6 and the smartphone 8. This coordinating function is implemented by causing the smartphone 8 to execute an application program for coordination (hereinafter, referred to as a coordination application).

Specifically, the coordination application causes the smartphone 8 to function so as to perform communication connection with the car audio apparatus 6 through communication using a predetermined communication protocol and transmit information relating to the reproduction application 42 installed in the smartphone 8 to the car audio apparatus 6. By this means, the information relating to the reproduction application 42 is recorded in advance in the car audio apparatus 6, and the user can perform operation of designating and executing or switching an application to a desired application among the reproduction application 42 recorded in advance by operating the operating unit 54 of the car audio apparatus 6.

The information of the reproduction application 42 transmitted by the smartphone 8 includes correspondence relationship (FIG. 5) among the reproduction application 42, the remote control communication protocols Pc and the sound communication protocols Pv. Based on this information, the car audio apparatus 6 can determine the sound communication protocol Pv which is likely to be used by the smartphone 8 and the remote control communication protocol Pc to be used for remote control of each reproduction application 42.

Then, in step Sb2, in the case where the user performs operation of switching the reproduction application 42 on the car audio apparatus 6, a request for switching the reproduction application 42 is transmitted from the car audio apparatus 6 to the smartphone 8 through communication using a predetermined communication protocol. This request is received at the smartphone 8, and the smartphone 8 switches the reproduction application 42. Subsequently, the car audio apparatus 6 transmits a connection request (an AVRCP connection request in step Sb4) of communication which uses the remote control communication protocol Pc to be used by the reproduction application 42 which is a switching destination for remote control, to the smartphone 8. In response to this transmission, the smartphone 8 transmits a connection response (OK) (in step Sb4, an AVRCP connection response (OK)), so that communication connection using this remote control communication protocol Pc is established.

Further, in step Sb2, in the case where the user performs operation of switching the reproduction application 42 on the smartphone 8, the smartphone 8 switches the reproduction application 42 based on the operation. Subsequently, the smartphone 8 transmits a connection request (an AVRCP connection request in step Sb4) of communication which uses the remote control communication protocol Pc to be used by the reproduction application 42 which is a switching destination for remote control, to the car audio apparatus 6. In response to this transmission, the car audio apparatus 6 transmits a connection response (OK) (in step Sb4, an AVRCP connection response (OK)), so that communication connection using this remote control communication protocol Pc is established.

Subsequently, for example, the user operates the car audio apparatus 6 or the smartphone 8 to give an instruction of start of sound reproduction. Triggered by this instruction, a remote control command signal B (in the illustrated example, a reproduction start request and a reproduction start response) is transmitted/received between the car audio apparatus 6 and the smartphone 8A connected using HDMI through communication using AVRCP as the remote control communication protocol Pc (step Sb6). For example, in the case where the user operates the car audio apparatus 6 to give an instruction of start of sound reproduction, a reproduction start request is transmitted from the car audio apparatus 6 to the smartphone 8A connected using HDMI. As a response to this request (reproduction start request), a reproduction start response (OK) is transmitted from the smartphone 8A connected using HDMI to the car audio apparatus 6.

Subsequently, the smartphone 8A connected using HDMI executes processing of transmitting the sound signal A3 to be reproduced to the car audio apparatus 6.

In this processing, the sound communication protocol Pv is not designated in the reproduction application 42A. Therefore, the smartphone 8A connected using HDMI transmits the sound communication request to the car audio apparatus 6 using A2DP which is a protocol of Bluetooth used as the remote control communication protocol Pc as the sound communication protocol Pv (step Sb7).

When the car audio apparatus 6 receives the sound communication request, the above-described input control processing (FIG. 8) is performed. In the case illustrated in FIG. 10, HDMI with a higher priority than that of A2DP is recorded in the communication possible protocol storing unit 63 of the car audio apparatus 6. Therefore, the car audio apparatus 6 returns a response (NG) indicating rejection of communication connection of sound communication to the smartphone 8A connected using HDMI (step Sb8). Further, also in the case where the car audio apparatus 6 receives the sound signal A3 through communication connection using HDMI as the sound communication protocol Pv, in order to avoid interruption of reception operation, the car audio apparatus 6 returns a response (NG) indicating rejection of communication connection of sound communication to the smartphone 8A connected using HDMI.

Because the sound communication request is rejected, the smartphone 8A connected using HDMI transmits the sound communication request to the car audio apparatus 6 again through communication using other sound communication protocol Pv (step Sb9). In the case illustrated in FIG. 10, because the smartphone 8A connected using HDMI can use only HDMI as other sound communication protocol Pv, a sound communication request using HDMI as the sound communication protocol Pv is transmitted to the car audio apparatus 6.

When the car audio apparatus 6 receives this sound communication request, the above-described input control processing (FIG. 8) is performed again. Because the sound communication request is transmitted through communication using HDMI which has the highest priority as the sound communication protocol Pv, the car audio apparatus 6 returns a response (OK) indicating that communication connection of sound communication is accepted (step Sb10).

By the smartphone 8A connected using HDMI receiving this response, communication connection using HDMI as the sound communication protocol Pv is established between the car audio apparatus 6 and the smartphone 8A connected using HDMI. The smartphone 8A connected using HDMI then transmits the sound signal A3 to the car audio apparatus 6 through communication using HDMI as the sound communication protocol Pv (step Sb11).

By this means, the sound signal A3 is transmitted from the smartphone 8A connected using HDMI to the car audio apparatus 6 using the sound communication protocol Pv with the highest priority, that is, the sound communication protocol Pv with which reproduction sound quality becomes favorable among the sound communication protocols Pv which can be utilized between the car audio apparatus 6 and the smartphone 8A connected using HDMI.

Note that, in the operation in FIG. 10, in the case where the user disconnects an HDMI cable which connects the car audio apparatus 6 and the smartphone 8A connected using HDMI upon switching from the reproduction application 42E to the reproduction application 42A (step Sb3), HDMI connection (physical link) is disconnected. As a result of this disconnection, a record of HDMI is deleted from the communication possible protocol storing unit 63 of the car audio apparatus 6.

Therefore, in this case, when the car audio apparatus 6 receives the sound communication request using A2DP as the sound communication protocol Pv (step Sb7), the car audio apparatus 6 returns a response (OK) indicating that communication connection of sound communication is accepted, establishes communication connection of communication using A2DP as the sound communication protocol Pv with the smartphone 8A connected using HDMI, and receives the sound signal A3 through this communication.

FIG. 11 is a diagram illustrating correspondence among a communication possible sound protocol, a sound communication request protocol and an input control result.

In this figure, the communication possible sound protocol indicates a communication protocol with the highest priority among the sound communication protocols Pv recorded in the communication possible protocol storing unit 63 of the car audio apparatus 6, that is, among the sound communication protocols Pv which can be utilized in communication for which communication connection is being established between the car audio apparatus 6 and the smartphone 8A connected using HDMI.

The sound communication request protocol indicates the sound communication protocol Pv which is used by the smartphone 8 for communication of the sound communication request.

The input control result indicates a result of input control processing performed by the car audio apparatus 6 when the sound communication request of communication using the sound communication protocol Pv indicated in the sound communication request protocol is transmitted to the car audio apparatus 6 in a state where the sound communication protocol Pv indicated in the communication possible sound protocol is recorded in the communication possible protocol storing unit 63.

As illustrated in FIG. 11, when the sound communication request of communication using the sound communication protocol Pv with a higher priority than that of the sound communication protocol Pv recorded in the communication possible protocol storing unit 63 is transmitted to the car audio apparatus 6, the car audio apparatus 6 accepts this sound communication request and establishes communication connection. Upon establishment of this communication connection, by the car audio apparatus 6 disconnecting communication for which communication connection has been established in advance, it is possible to reliably prevent the sound signal A3 from being received through communication using the sound communication protocol Pv with a lower priority.

On the other hand, in the case where the priority is low, the car audio apparatus 6 rejects this sound communication request. By this means, options for the sound communication protocol Pv to be used by the smartphone 8 are limited. Therefore, the car audio apparatus 6 indirectly performs control so that the sound communication protocol Pv with the highest priority among the sound communication protocols Pv which can be used between the car audio apparatus 6 and the smartphone 8 is used for the sound communication request.

Here, in this in-vehicle audio system 1, as described above, sound can be reproduced by the reproduction application 42 of the smartphone 8 being controlled from the car audio apparatus 6. Therefore, this in-vehicle audio system 1 is configured such that, when the car audio apparatus 6 is shut down during execution of the reproduction application 42, the car audio apparatus 6 continues sound reproduction of the reproduction application 42 upon next activation.

Specifically, when the car audio apparatus 6 is shut down by an ACC power supply of the vehicle 2 being turned off, information of the reproduction application 42 which is being executed at that time (information for specifying audio data D1 (or the sound signal A3) which is being reproduced) and the sound communication protocol Pv used for transmission of the sound signal A3 are stored in a built-in non-volatile memory.

In the case where the information of the reproduction application 42 is stored in the non-volatile memory, the car audio apparatus 6 establishes communication connection of communication using the remote control communication protocol Pc upon activation in order to enable continuation of sound reproduction by the reproduction application 42. The car audio apparatus 6 then transmits a reproduction start request of the audio data D1 (sound signal A3) which is being reproduced to the smartphone 8 (FIG. 10, step Sb6). Further, in order that the sound signal A3 might be received with the sound communication protocol Pv used before shut-down, the sound communication protocol Pv stored in the non-volatile memory is stored in the communication possible protocol storing unit 63.

When the smartphone 8 receives the reproduction start request, the smartphone 8 transmits the sound communication request using the sound communication protocol Pv previously determined for the reproduction application 42 or determined by the sound communication protocol determining unit 47 (FIG. 2), to the car audio apparatus 6 (FIG. 10, step Sb7).

Then, by the car audio apparatus 6 performing the above-described input control processing, the sound communication request of communication using the sound communication protocol Pv used before shut-down or the sound communication protocol Pv with a higher priority than that used before shut-down is accepted by the car audio apparatus 6, and communication connection is established, so that the sound signal A3 is transmitted from the smartphone 8 through communication using the sound communication protocol Pv.

According to the embodiment described above, the following effects are provided.

That is, according to the present embodiment, the car audio apparatus 6 is configured such that, in the case where the car audio apparatus 6 receives a communication request for transmission of the sound signal A3 from the smartphone 8, accepts this communication request according to the priority of the sound communication protocol Pv of the requested communication.

According to this configuration, because only a request of communication of the sound communication protocol Pv according to the priority is accepted, it is possible to receive the sound signal A3 through communication using the sound communication protocol Pv with the higher priority. By this sound signal A3 being reproduced, it is possible to realize favorable and the best sound reproduction with high priority.

Particularly, it is possible to maintain favorable reproduction quality or realize favorable reproduction for the user by setting the priority according to reproduction quality of the sound signal A3 of audio or according to the order which is considered as the best by the user.

Further, according to the present embodiment, the car audio apparatus 6 is configured to, only in the case where the priority of the sound communication protocol Pv of communication for which the sound communication is requested is the highest among the sound communication protocols Pv which can be used for communication with the smartphone 8, accept the sound communication request.

By this means, it is possible to always realize the best reproduction quality or the best reproduction for the user.

Further, according to the present embodiment, the car audio apparatus 6 is configured to judge the priority such that the sound communication protocol Pv of communication which has been established with the smartphone 8 and the sound communication protocol Pv of communication for which sound communication is requested are the sound communication protocols Pv which can be used for communication for transmitting the sound signal A3 with the smartphone 8.

By this means, it is possible to judge the priority within a range of the sound communication protocols Pv with which communication can be reliably performed while eliminating communication for which communication connection has already been disconnected due to disconnection of a wired cable, turning off of radio communication, or the like.

Further, according to the present embodiment, the car audio apparatus 6 is configured to disconnect connection of communication using a sound communication protocol Pv (for example, A2DP) with lower priority than that of the sound communication protocol Pv (for example, HDMI) for the requested communication among communication for which communication connection is being established in the case where the car audio apparatus 6 accepts the communication request.

By this means, it is possible to reliably prevent the car audio apparatus 6 from receiving the sound signal A3 through communication using the sound communication protocol Pv with low priority.

Further, as a result of unnecessary communication being disconnected, it is possible to suppress power consumption. Particularly, in the case where all radio communication whose power consumption is larger than that of wired communication is disconnected, it is possible to largely suppress power consumption.

Further, according to the present embodiment, the car audio apparatus 6 is configured to, when another communication connection of sound communication according to the sound communication protocol Pv has been already established with the smartphone 8 in the case where the car audio apparatus 6 receives a communication request from the smartphone 8, reject the communication request without accepting the communication request to maintain the communication connection.

By the communication connection which has been already established being maintained in this manner, it is possible to avoid a situation where communication connection is disconnected in association with switching of the sound communication protocol Pv and communication for transmitting/receiving the sound signal A3 is temporarily interrupted. Further, it is possible to prevent occurrence of temporal sound drop-out in association with this interruption of the communication.

The above-described embodiment is merely an example of one aspect of the present invention, and can be arbitrarily modified and applied within a range not departing from the spirit of the present invention.

While, in the above-described embodiment, the car audio apparatus 6 is configured to determine the priority of the sound communication protocol Pv every time the car audio apparatus 6 receives a sound communication request which requests transmission of the sound signal A3, the present invention is not limited to this, and the car audio apparatus 6 may be configured to accept the sound communication request without determining the priority for a predetermined sound signal A3.

Specifically, in the case where the car audio apparatus 6 and the smartphone 8 coordinate with each other for communication to implement a hands-free call function through Bluetooth, for the sound communication request for transmitting the sound signal A3 for a phone call, the car audio apparatus 6 may be configured to accept the sound communication request without determining the priority.

By this means, it is possible to perform smooth and prompt reproduction output of sound of a phone call (phone conversation) without the reproduction output being inhibited.

Note that a communication protocol to be used by the car audio apparatus 6 and the smartphone 8 for a hands-free call is defined separately from a protocol for transmitting the sound signal A3 of audio. Therefore, the car audio apparatus 6 can judge whether or not the sound communication request is a sound communication request for transmitting the sound signal A3 of a phone call by judging whether or not a communication protocol of communication for which sound communication is requested is a protocol for a hands-free call.

Further, in a state where a plurality of smartphones 8 are connected to the car audio apparatus 6 through Bluetooth so as to be able to perform communication, in the case where any one of the smartphones 8 starts a hands-free call, there may be a case where the sound signal A3 for a hands-free call is transmitted to the car audio apparatus 6 through communication using the sound communication protocol Pv (for example, HDMI) with the highest priority.

In this case, even when communication connection using the sound communication protocol Pv (for example, A2DP) with lower priority is established with other smartphone 8, the car audio apparatus 6 does not disconnect communication which is being established in order to prevent interruption of the sound signal A3 from the smartphone 8.

Further, in the above-described embodiment, while the configuration of the smartphone 8 illustrated in FIG. 2 and the configuration of the car audio apparatus 6 illustrated in FIG. 5 are described, respectively, while functional configurations are classified according to main processing content to facilitate understanding of the present invention, the configurations of the smartphone 8 and the car audio apparatus 6 can be classified into more components according to the processing content.

Further, it is also possible to classify the components so that one component executes more kinds of processing. Further, processing of each component may be executed with a piece of hardware or may be executed with a plurality of pieces of hardware. Further, processing of each component may be implemented with one program or may be implemented with a plurality of programs.

Further, in the above-described embodiment, a processing unit in the flowchart in FIG. 8 and a processing unit in the sequence in FIG. 10 are divided according to main processing content to facilitate understanding of the present invention. The present invention is not limited by the way or name of division of processing units. That is, each processing unit can be divided into more processing units according to processing content. Further, it is also possible to divide each processing unit so that one processing unit includes more kinds of processing.

Further, in the above-described embodiment, the smartphone 8 can include, for example, a radio wave and a television broadcasting wave as audio sources. Further, the smartphone 8 may download the audio data D1 from the distribution server 12 in advance and store the audio data D1 in a built-in recording medium (for example, the audio data accumulating unit 20), and the car audio apparatus 6 may reproduce sound based on this audio data D1.

Further, in the above-described embodiment, a plurality of smartphones 8 can be connected to the car audio apparatus 6 at the same time so as to be able to perform communication. Still further, the car audio apparatus 6 may individually perform input control processing (FIG. 8) for each of these plurality of smartphones 8 and maintain the best sound reproduction for each of the smartphones 8.

Further, while, in the above-described embodiment, the car audio apparatus 6 has been described as an example as an audio reproduction apparatus which reproduces the sound signal A3 of audio, the audio reproduction apparatus is not limited to this. That is, the audio reproduction apparatus may be any apparatus which can perform communication using each of a plurality of communication protocols with which a sound signal of audio can be transmitted, and which receives input of the sound signal A3 through communication using any of these communication protocols from external equipment and reproduces the sound signal A3 as audio.

For example, the audio reproduction apparatus may be other in-vehicle equipment such as a navigation apparatus. Further, the audio reproduction apparatus is not limited to in-vehicle equipment, and may be, for example, a portable apparatus such as a portable audio player, or a stationary apparatus such as audio reproduction equipment, a television apparatus and a recording and reproduction apparatus.

Further, while, in the above-described embodiment, the smartphone 8 has been described as an example of external equipment which inputs the sound signal A3 to the audio reproduction apparatus, the external equipment is not limited to this. That is, the external equipment may be any equipment which inputs the sound signal A3 based on the audio source to the audio reproduction apparatus through communication using a communication protocol with which the sound signal can be transmitted.

For example, the external equipment may be a portable information terminal such as a mobile phone, a tablet-type PC and a laptop PC, or a stationary apparatus such as a stationary PC, a television apparatus and a recording and reproduction apparatus.

Further, while, in the above-described embodiment, the in-vehicle audio system 1 has been described as an example of the audio reproduction system which inputs the sound signal A3 from external equipment to the audio reproduction apparatus and reproduces the sound signal A3 as audio, the audio reproduction system is not limited to this. That is, the audio reproduction system may be any system which includes the above-described audio reproduction apparatus and external equipment.

Further, while, in the above-described embodiment, the in-vehicle audio system 1 is configured to reproduce audio sound, the in-vehicle audio system 1 may be a so-called audio visual reproduction system which performs reproduction of an image along with reproduction of audio sound.

Further, the following image reproduction system may be configured by reading "sound" as an "image" in the above-described embodiment.

That is, it is also possible to configure an image reproduction system including an image reproduction apparatus which includes a communication unit configured to perform communication according to each of a plurality of communication protocols for transmitting an image signal, and an image reproducing unit configured to reproduce the image signal received through the communication, and external equipment configured to transmit the image signal to the image reproduction apparatus through communication according to any of the communication protocols, the image reproduction apparatus including a priority storing unit configured to store a priority of the communication protocols in advance, and a control unit configured to, in the case where a communication request for transmitting the image signal is received from the external equipment, accept the communication request according to the priority of a communication protocol of requested communication, and, in the case where the communication request is not accepted, the external equipment changes the communication protocol to transmit the communication request to the image reproduction apparatus.

Further, while, in the above-described embodiment, Bluetooth, HDMI and USB have been described as examples of communication standards used for communication for transmitting the sound signal A3 from the external equipment to the audio reproduction apparatus, the communication standards are not limited to these, and, for example, other communication standards such as Wi-Fi (registered trademark) which is one of standards for wireless LAN may be used.

Further, as the sound communication protocol Pv to be used for transmission of the sound signal A3, a sound communication protocol defined by communication standards to be used for communication between the external equipment and the audio reproduction apparatus is used as appropriate.

Further, while, in the above-described embodiment, a configuration has been described as an example where the audio reproduction apparatus and the external equipment are connected so as to be able to perform communication through both radio communication and wired communication, the audio reproduction apparatus and the external equipment may be connected through one of radio communication and wired communication.

That is, the present invention can be applied to an audio reproduction apparatus which performs communication complying with a plurality of communication protocols to be used for transmission of a sound signal regardless of whether communication is radio communication or wired communication, and an audio reproduction system including the audio reproduction apparatus and external equipment.

REFERENCE SIGNS LIST

1 in-vehicle audio system (audio reproduction system)
6 car audio apparatus (audio reproduction apparatus)
8 smartphone (external equipment)
24 peripheral equipment connecting unit
27 sound signal transmission controlling unit
32 radio communication unit
34 wired communication unit
42, 42A to 42E reproduction application
46 remote control command transmission/reception
47 function
51 sound communication protocol determining unit
52 inter-equipment communication unit (communication unit)
53 reproduction processing unit
55 sound signal input controlling unit (control unit)
56 radio communication unit
56 wired communication unit
62 priority storing unit 63 communication possible protocol storing unit
64 priority data
A1 sound reproduction signal
A3 sound signal
B remote control command signal
D1 audio data
Pc remote control communication protocol
Pv sound communication protocol

The invention claimed is:

1. An audio reproduction apparatus comprising:
a communication unit including a radio communication part and a wired communication part which are provided with a transmission circuit and a reception circuit, respectively, and performing communication according to each of a plurality of communication protocols for transmitting a sound signal of audio;
a reproduction processing unit including an audio amplifier, and reproducing the sound signal received through the communication, and which receives a sound signal from an external equipment through communication according to any of the communication protocols;
a priority storing unit including a first memory, and storing a priority of the communication protocols in advance;
a communication possible protocol storing unit including a second memory, and storing the communication protocols used for transmitting the sound signal with the external equipment; and
a control unit including a CPU, and connecting with the communication unit, the reproduction processing unit, the priority storing unit, and the communication possible protocol storing unit,
wherein in a case where a first communication request for transmitting the sound signal is received from the external equipment, the control unit accepts the first communication request only in a case where a priority of a communication protocol of the first communication request is the highest among the communication protocols stored in the communication possible protocol storing unit including the communication protocol of the first communication request,
wherein in a case where a physical link connecting with the external equipment is established by a wired cable in the wired communication part, the communication possible protocol storing unit stores a communication protocol corresponding to the wired cable in a condition in which a logical communication connection is established so as to be capable of transmitting and receiving data, and
wherein, in a case where a second communication request for transmitting a sound signal is received from the external equipment, when another communication according to a communication protocol is being established with the external equipment, the control unit rejects the second communication request to maintain another communication even in a case where a priority of a communication protocol of the second communication request is the highest.

2. The audio reproduction apparatus according to claim 1, wherein, in a case where a third communication request is accepted, the control unit disconnects connection of communication using a sound communication protocol with a lower priority than a priority of a sound communication protocol of the third communication request among communication for which communication connection is being established.

3. The audio reproduction apparatus according to claim 1, wherein the priority is determined based on sound quality of reproduced audio.

4. The audio reproduction apparatus according to claim 1, wherein, in a case where the external equipment is a phone, the control unit accepts a fourth communication request for transmitting a sound signal of a phone call made through the external equipment regardless of the priority of the communication protocols.

5. An audio reproduction system comprising:
an audio reproduction apparatus including
a communication unit including a radio communication part and a wired communication part which are provided with a transmission circuit and a reception circuit, respectively, and performing communication according to each of a plurality of communication protocols for transmitting a sound signal of audio,
a reproduction processing unit including an audio amplifier, and reproducing the sound signal received through the communication,
a priority storing unit including a first memory, and storing a priority of the communication protocols in advance,
a communication possible protocol storing unit including a second memory, and storing the communication protocols used for transmitting the sound signal with an external equipment, and
a control unit including a CPU, and connecting with the communication unit, the reproduction processing unit, the priority storing unit, and the communication possible protocol storing unit; and
the external equipment transmitting a sound signal to the audio reproduction apparatus through communication according to any of the communication protocols,
wherein
in a case where a first communication request for transmitting the sound signal is received from the external equipment, the control unit accepts the first communication request only in a case where a priority of a communication protocol of the first communication request is the highest among the communication protocols stored in the communication possible protocol storing unit including the communication protocol of the first communication request,
wherein in a case where a physical link connecting with the external equipment is established by a wired cable in the wired communication part, the communication possible protocol storing unit stores a communication protocol corresponding to the wired cable in a condition in which a logical communication connection is established so as to be capable of transmitting and receiving data,
wherein, in a case where a second communication request for transmitting a sound signal is received from the external equipment, when another communication according to a communication protocol is being established with the external equipment, the control unit rejects the second communication request to maintain another communication even in a case where a priority of a communication protocol of the second communication request is the highest,
wherein in a case where a third communication request is rejected, the external equipment changes the communication protocol to transmit the third communication request to the audio reproduction apparatus.

6. An audio reproduction system comprising:
an audio reproduction apparatus including
- a communication unit including a radio communication part and a wired communication part which are provided with a transmission circuit and a reception circuit, respectively, performing communication according to each of a plurality of sound communication protocols for transmitting a sound signal of audio, and performing communication according to each of a plurality of remote control communication protocols which is defined in advance for each of a plurality of reproduction applications stored in an external equipment and which is used for transmitting and receiving a remote control communication signal,
- a reproduction processing unit including an audio amplifier, and reproducing the sound signal received through the communication,
- a priority storing unit including a memory, and storing a priority of the sound communication protocols in advance, and
- a control unit including a CPU, and connecting with the communication unit, the reproduction processing unit, and the priority storing unit; and the external equipment including
- a connecting unit including a radio communication part and a wired communication part which are provided with a transmission circuit and a reception circuit, respectively, and transmitting a sound signal to the audio reproduction apparatus through communication according to any of the sound communication protocols,
- a sound communication protocol determining unit which is provided with a CPU and a memory, and determining a sound communication protocol to be used for transmission of the sound signal, wherein in a case where a first communication request for transmitting a sound signal is received from the external equipment, the control unit accepts the first communication request according to a priority of a sound communication protocol of the first communication request, wherein in a case where a second communication request is rejected, the external equipment changes the sound communication protocol to transmit the second communication request to the audio reproduction apparatus, and wherein when the sound communication protocol to be used for transmission of the sound signal is not set in a reproduction application, the sound communication protocol determining unit determines a communication protocol which is defined in a same communication standard as a remote control communication protocol of the reproduction application, so as to determine the communication protocol as the sound communication protocol.

* * * * *